(12) United States Patent
Boland et al.

(10) Patent No.: US 10,353,936 B2
(45) Date of Patent: *Jul. 16, 2019

(54) NATURAL LANGUAGE INTERPRETATION OF HIERARCHICAL DATA

(71) Applicant: International Business Machines Corporation, Armonk, NY (US)

(72) Inventors: James P. Boland, Kanata (CA); David M. Doran, Nepean (CA); Niketh J. Kala, Khammam (CA); Junaid Y. A. Mohammed, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 422 days.

This patent is subject to a terminal disclaimer.

(21) Appl. No.: 15/157,661

(22) Filed: May 18, 2016

(65) Prior Publication Data

US 2017/0004206 A1    Jan. 5, 2017

Related U.S. Application Data

(63) Continuation of application No. 14/755,212, filed on Jun. 30, 2015.

(51) Int. Cl.
*G06F 16/00* (2019.01)
*G06F 16/335* (2019.01)
(Continued)

(52) U.S. Cl.
CPC .......... *G06F 16/337* (2019.01); *G06F 16/282* (2019.01); *G06F 16/3344* (2019.01); *G06F 16/355* (2019.01); *G06F 16/9024* (2019.01)

(58) Field of Classification Search
CPC ......... G06F 17/30589; G06F 17/30684; G06F 17/30958; G06F 16/282; G06F 16/355; G06F 16/3344; G06F 16/9024
See application file for complete search history.

(56) References Cited

U.S. PATENT DOCUMENTS 7,664,343 B2    2/2010   Withum et al.
7,774,198 B2 *  8/2010   Roulland .......... G06F 17/30672
                                                          704/9

(Continued)

OTHER PUBLICATIONS

Jose Saias, Paulo Quaresma, Pedro Salgueiro, and Tiago Santos, "BINLI: An Ontology-Based Natural Language Interface for Multidimensional Data Analysis", Intelligent Information Management, 2012, Scientific Research, pp. 225-230. (Year: 2012).*

(Continued)

*Primary Examiner* — Cheryl Lewis
(74) *Attorney, Agent, or Firm* — Gilbert Harmon, Jr.

(57) ABSTRACT

A computer-implemented method includes receiving a search label and accessing a hierarchical data source comprising a plurality of nodes. One node may be a context node. The method further includes determining a similarity score between the search label and a node label of each node, determining a contextual score between the context node and each node, combining, for each node, the similarity score with the contextual score to yield a combined score, and returning a result. The result may be based on ordering the plurality of nodes according to each node's combined score. A corresponding computer program product and computer system are also disclosed.

9 Claims, 4 Drawing Sheets

(51) Int. Cl.
  *G06F 16/28* (2019.01)
  *G06F 16/35* (2019.01)
  *G06F 16/33* (2019.01)
  *G06F 16/901* (2019.01)

(56) References Cited

U.S. PATENT DOCUMENTS

| | | | |
|---|---|---|---|
| 8,346,563 | B1 | 1/2013 | Hjelm et al. |
| 8,935,277 | B2 | 1/2015 | Kuchmann-Beauger et al. |
| 2005/0043940 | A1 | 2/2005 | Elder |
| 2007/0156393 | A1* | 7/2007 | Todhunter ......... G06F 17/30719 704/9 |
| 2009/0112835 | A1 | 4/2009 | Elder |
| 2009/0144248 | A1* | 6/2009 | Treadgold ........... G06F 17/2785 |
| 2012/0254143 | A1 | 10/2012 | Varma et al. |
| 2014/0149446 | A1 | 5/2014 | Kuchmann-Beauger et al. |
| 2015/0066477 | A1 | 3/2015 | Hu |

OTHER PUBLICATIONS

Valentin Tablan, Danica Damijanovic, and Kalina Bontcheva, "A Natural Language Query Interface to Structured Information", ACM, Jun. 1-5, 2008, pp. 1-15. (Year: 2008).*

IBM, "List of IBM Patents or Patent Applications Treated as Related", Appendix P, 2 pages, dated May 18, 2016.

Pettersson et al.; "Normalisation of Historical Text Using Context-Sensitive Weighted Levenshtein Distance and Compound Splitting"; Proceedings of the 19th Nordic Conference of Computational Linguistics (NODALIDA 2013); Linköping Electronic Conference Proceedings #85; pp. 163-179.

Saias et al.; "BINLI: An Ontology-Based Natural Language Interface for Multidimensional Data Analysis"; Intelligent Information Management; Published Online Sep. 2012; 4; Copyright © 2012 SciRes; pp. 225-230.

Tablan et al.; "A Natural Language Query Interface to Structured Information"; 15 pages.

Ziolko et al.; "Modified Weighted Levenshtein Distance in Automatic Speech Recognition"; Krynica; Sep. 14-18, 2010; 5 pages.

"Search results on a treeview widget"; Stack Exchange, User Experience; Printed on: May 29, 2015; pp. 1-2; <http://ux.stackexchange.com/questions/11667/search-results-on-a-treeview-widget>.

"Tree traversal"; Wikipedia; Last modified: May 2, 2015; Printed on: May 29, 2015; pp. 1-6; <http://en.wikipedia.org/wiki/Tree_traversal>.

"Working with TreeView Controls"; Code Project; Posted Jan. 22, 2008; Last updated: May 19, 2015; Article copyright 2008 by salysle; Everything else Copyright © CodeProject, 1999-2015; pp. 1-11; <http://www.codeproject.com/Articles/23115/Working-with-TreeView-Controls>.

Boland et al., "Natural Language Interpretation of Hierarchical Data", U.S. Appl. No. 14/755,212, filed Jun. 30, 2015, 28 pages.

* cited by examiner

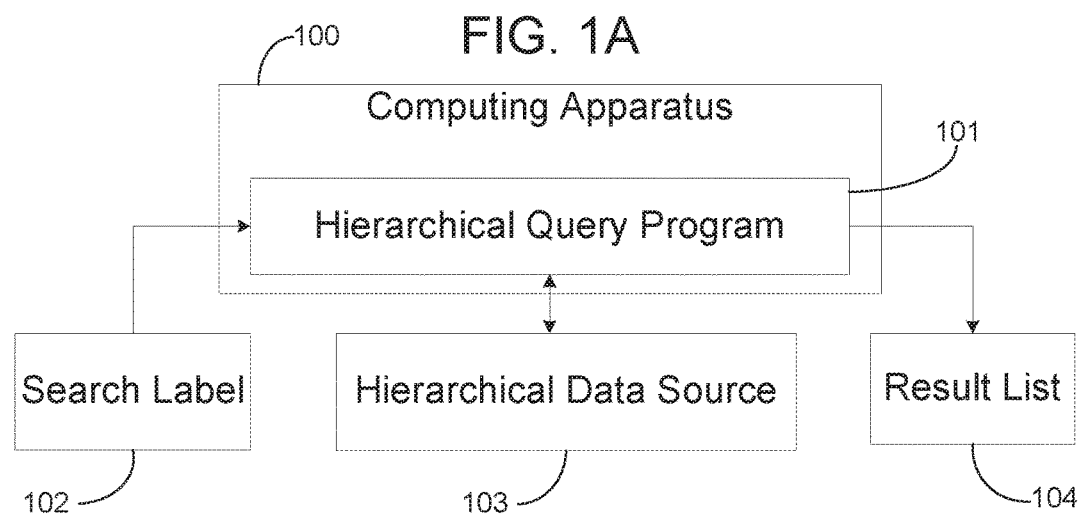
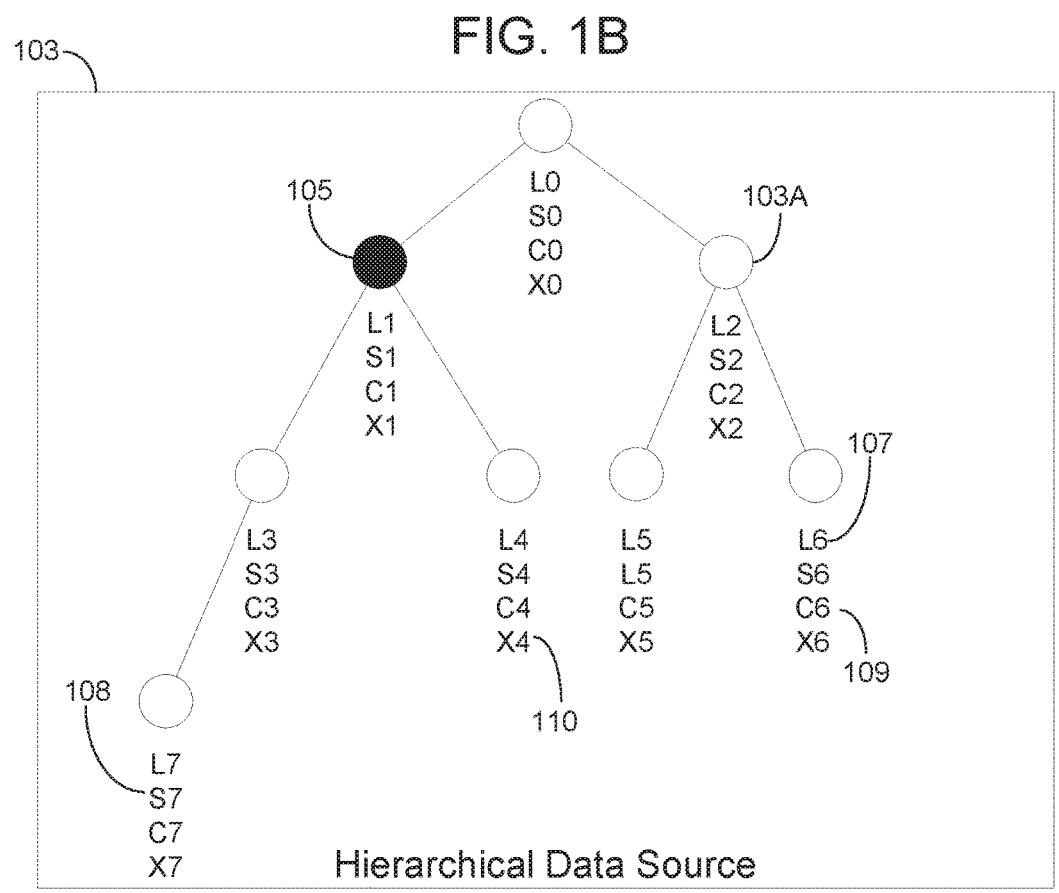

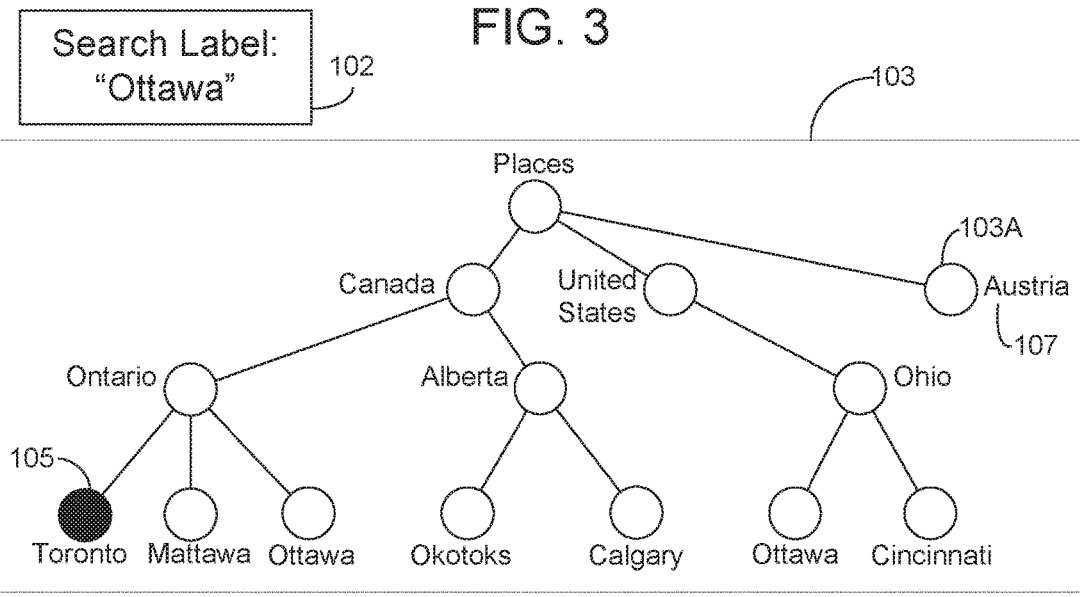

| Node Label | Length (L) | Similarity Score (SS) | Contextual Score (CS) | Combined Score | Discard Rule |
|---|---|---|---|---|---|
| Toronto | 7 | 7 | 0 | - | CS=0 |
| Places | 6 | 7 | 3 | - | SS >= L+1 |
| Ohio | 4 | 6 | 5 | - | SS >= L+1 |
| Ottawa (ON)* | 6 | 1 | 2 | 2 | |
| Ontario | 7 | 5 | 1 | 5 | |
| Ottawa (OH)* | 6 | 1 | 6 | 6 | |
| Mattawa | 7 | 3 | 2 | 6 | |
| Canada | 6 | 5 | 2 | 10 | |
| Alberta | 7 | 7 | 3 | 21 | |
| Okotoks | 7 | 6 | 4 | 24 | |
| Austria | 7 | 6 | 4 | 24 | |
| Calgary | 7 | 7 | 4 | 28 | |
| United States | 13 | 11 | 4 | 44 | |
| Cincinnati | 10 | 10 | 6 | 60 | |

*The parenthetical regional abbreviations serve to distinguish the same-label records, but are not otherwise a part of the example data.

US 10,353,936 B2

NATURAL LANGUAGE INTERPRETATION OF HIERARCHICAL DATA

CROSS REFERENCE TO RELATED APPLICATIONS

This application is a continuation of U.S. patent application Ser. No. 14/755,212, filed Jun. 30, 2015, now U.S. Pat. No. 10,169,452, which is incorporated by reference in its entirety.

BACKGROUND

The present invention relates generally to natural language queries and in particular to scoring the results of querying hierarchical data based on a natural language label.

Multidimensional hierarchical data sets such as OnLine Analytical Processing (OLAP) cubes have become widely used and increasingly detailed. Simultaneously, interactive natural language search systems such as Apple® Siri®, Google® Now™, and Microsoft® Cortana™ have become increasingly sophisticated and useful for querying a variety of different data sources. The invention relates to the application of interactive natural language search systems to querying multidimensional hierarchical data sets.

SUMMARY

A computer-implemented method includes receiving a search label and accessing a hierarchical data source comprising a plurality of nodes. One node may be a context node. The method further includes determining a similarity score between the search label and a node label of each node, determining a contextual score between the context node and each node, combining, for each node, the similarity score with the contextual score to yield a combined score, and returning a result. The result may be based on ordering the plurality of nodes according to each node's combined score. A corresponding computer program product and computer system are also disclosed.

BRIEF DESCRIPTION OF THE DRAWINGS

FIG. 1A is a block diagram of one embodiment of a computer system environment suitable for operation of the invention.

FIG. 1B is a diagram of various logical components of the hierarchical data source 103, according one embodiment of the invention.

FIG. 3 is a diagram of an example data set according to one embodiment of the invention.

FIG. 4 is a table showing one possible representation of the result list 104 of an example data set according one embodiment of the invention.

DETAILED DESCRIPTION

Figure 2:
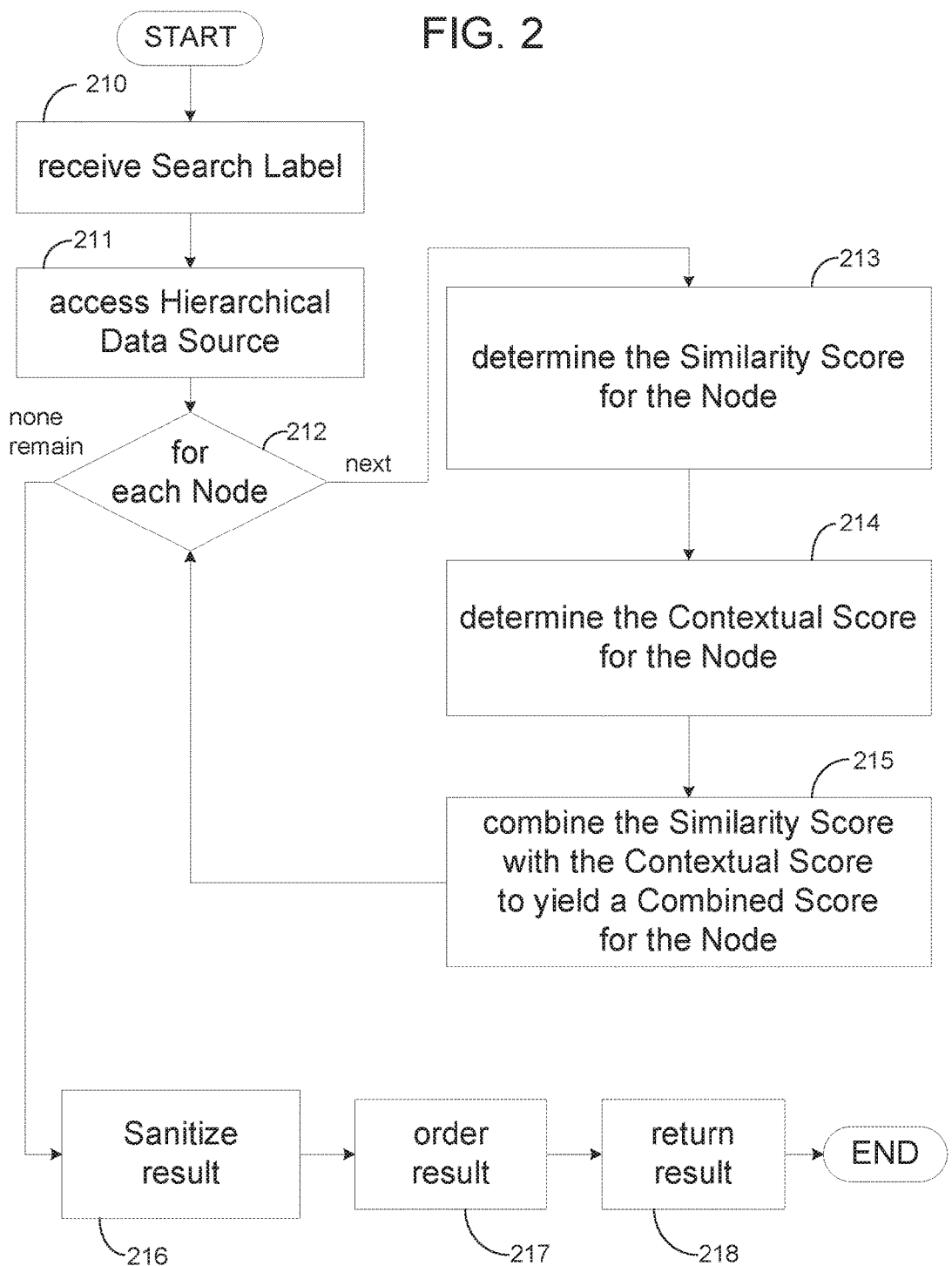
FIG. 2 is a flow chart diagram of a method for the hierarchical query program 101, according to one embodiment of the invention.

Referring now to the invention in more detail, the invention is generally directed to improvements in scoring the results of querying hierarchical data based on a natural language label. FIG. 1A is a block diagram of a computer system environment in which one embodiment of the invention may operate. FIG. 1A displays the computing apparatus 100, the hierarchical query program 101, the search label 102, the hierarchical data source 103, and the result list 104. In particular, a hierarchical query program 101 may be configured for execution by, operation on, and/or storage on and/or in a computing apparatus 100. The hierarchical query program 101 receives a search label 102, accesses a hierarchical data source 103, and returns, generically, a result. In one embodiment, the result is a result list 104, as shown.

Referring still to FIG. 1A, the search label 102 includes data to be queried against a hierarchical data source 103. The search label may be a text string, but may also be an image, sound clip, video clip, or a portion thereof, or generally any type of data.

FIG. 1B shows a diagram of the various logical components of the hierarchical data source 103, according to one embodiment of the invention. FIG. 1B displays the hierarchical data source 103, the nodes 103A, the context node 105, the node labels 107, the similarity scores 108, the contextual scores 109, and the combined scores 110. Within the depicted hierarchical data source 103, there is a plurality of nodes 103A, each having a node label 107. It may be advantageous that the node labels 107 and the search label 102 are of the same or a similar type of data such that comparison between the search label 102 and the node labels 107 is feasible and meaningful.

In one embodiment, the node labels 107 and the search label 102 are text strings. The node labels 107 and search label 102 may be natural language text according to standard spelling or to phonetic spelling. Standard spelling of natural language text, for example according to various dictionaries in English or another human language, may be used, for example, for querying where a query is entered as text by the user. Where the query is entered by automated speech recognition (ASR), as in an interactive natural language search system, the search label 102 and the node labels 107 may be stored phonetically spelled natural language text. The phonetic spelling may be according to the International Phonetic Alphabet or to an alternative phonetic spelling system for English or another human language.

Referring still to FIGS. 1A and 1B, in one embodiment, each node may have associated therewith a similarity score 108. The hierarchical query program 101 may determine the similarity score 108 based on the results of a comparison between the search label 102 and each node label 107. Where the search label 102 and the node labels 107 represent image, sound, or video data, or data of some other type, the hierarchical query program 101 may make the comparison according to any method or system that returns a numerical score representing the similarity between the search label 102 and each node label 107. In one embodiment, the hierarchical query program 101 may normalize the similarity scores 108 into positive integers or floating point numbers, thereby preventing scores of zero, where the lesser the number (closer to zero) represents a more similar result.

In the case of ASR systems, a confidence score may be provided as to the match between a speech utterance and one or more strings. The hierarchical query program 101 may be integrated with this process, for example, the hierarchical query program may use the system's confidence score algorithm to directly compare the search label 102 and each node label 107. Alternatively, the ASR system may operate as a separate layer, returning one or more textual search labels 102 for the hierarchical query program 101 to test. In the case where an array of candidate search labels 102 is provided, for example as the output of an ASR system, then the hierarchical query program 101 need only repeat for each candidate search label 102, and the hierarchical query program may return combined or separate results.

In the case where the search label 102 and the node labels 107 are both text strings representing natural language text, whether according to standard spelling or phonetic spelling, the hierarchical query program 101 may determine a comparison score, understood as the similarity score 108, by calculating the edit distance, or Levenshtein distance (as used herein, and as claimed, the terms "edit distance" and "Levenshtein distance" are interchangeable) between the search label 102 and the node labels 107. In the basic Levenshtein distance algorithm, the result is the total count of insertions of a single character, deletions of a single character, or substitutions of one character for another that are needed to convert a first string into a second string. In the resulting scores, lesser numbers represent more similar results, and a score of zero (if allowed) represents a perfect match. The Levenshtein distance algorithm may be modified in numerous ways, for example where the various operations—insertions, deletions, and substitutions—are given differing weights, or where different operations are allowed, for example where substitutions are not treated as a single operation, or where the transposition of two adjacent characters is allowed as a single operation. Generally, any such modification to the Levenshtein distance or any relevant string metric may be used equivalently in the context of the present invention, subject to a restriction, for some embodiments, that the results be positive nonzero values with lesser numbers representing a more similar result.

Referring still to FIGS. 1A and 1B, according to one embodiment, the hierarchical query program accesses the hierarchical data source 103 as a tree-type graph of nodes 103A. In a tree-type graph, each node has a parent (except for the root node, L0 in FIG. 1) and zero or more child nodes. For example, in FIG. 1, L2 is a child of L0 and has children L5 and L6. Any desired constraints may be imposed upon the structure of the hierarchical data source 103, for example a requirement of a binary tree (a tree where each node has either two children or no children) or a requirement to have exactly n children may be imposed upon the hierarchical data source 103. In some embodiments, multiple parental relationships and cycles of parent-child relationships may be allowed.

In OLAP cubes and other hierarchical databases, nodes may be constrained in terms of their data content or label as well as their position in the hierarchy. A specific constraint contemplated in one embodiment of the present invention is that the hierarchical data source 103 is structured such that each child node represents, conceptually, a specific instance of its parent. A specific data point may be represented as a locus of nodes in any of several hierarchies, each hierarchy representing a dimension of the overall data (e.g. an OLAP cube), and modelable in a manner similar to the example hierarchical data source 103 of FIG. 1B. For example, a quantity representing sales of golf equipment in Toronto in 2014, may be accessed in the time dimension via a node 103A having a node label 107 "2014", and which is the child of a node 103A whose node label 107 is "2010-2019", representing the current decade.

This node 103A would, itself, be a child of a node 103A whose node label 107 is "time". Similarly, the "2014" node 103A may have child nodes representing smaller elements, such as sibling nodes 103A whose node labels 107 are "Q1", "Q2", "Q3", and "Q4", denoting the four quarters of the year 2014. The same general-to-specific hierarchy may be repeated for each dimension of the data set. Accordingly, a hierarchical query program may consider each dimension of the data set as a separate hierarchy or may model multiple dimensions as different branches of the same hierarchy.

In one embodiment, there is a given context node 105. The context node 105 may be generally understood as the node 103A most recently viewed, accessed, or considered. In the above example of a query for sales of golf equipment in Toronto in 2014, the query could, in a session of an interactive natural language search system, be succeeded by a query "How about 2013?". In this case, "2014" would be the node label 107 of the context node 105. The context node 105 may be within the hierarchical data source 103 that represents a time dimension, and from which the hierarchical query program 101 may perform a context-aware search. Similarly, "Toronto" represents the context in a geographic dimension, "sales" represents the context in a type-of-quantity dimension, and "golf equipment" represents the context in a products dimension.

Referring still to FIGS. 1A and 1B, the result list 104 represents one possible output of the hierarchical query program 101. In the embodiment described below, all nodes 103A the hierarchical query program 101 iterates over all nodes 103A of the hierarchical data source 103. The hierarchical query program 101 may traverse the hierarchical data source 103 along parent-child relationships, or independently of the hierarchy. In the depicted embodiment, the hierarchical query program 101 does not modify the hierarchical relationships among the nodes 103A. The hierarchical query program 101 may store the results in-situ, as properties of nodes 103A, or externally to the hierarchical data source, for example in the result list 104.

It should be noted that the visual representation of the similarity scores 108 in FIG. 1B as associated to the nodes 103A does require that the similarity scores 108 be stored in-situ as properties of nodes 103A. In general, the result list 104 may be any data structure. For example, the result list 104 may be a list, array, or other linear data structure including references to nodes 103A in relationship to the various calculated values described below. In other embodiments, the results list may be a reference to the single best node 103A, or a list of references to only the best n nodes 103A for a given n, where n is greater than or equal to one. The discussion herein of one embodiment uses, for the purpose of clarity, a rich output including calculation results, such as the example result list 104 of FIG. 4, however this level of detail is not a requirement of the present invention.

Referring now to FIG. 2, FIG. 2 shows a flow chart diagram describing the operation of the hierarchical query program 101, according to one embodiment. FIG. 2 displays steps 210, 211, 212, 213, 214, 215, 216, 217, and 218. At step 210, the hierarchical query program receives the search label 102. As above, there may be multiple search labels 102, for example where an ASR system returns an array of candidate search labels 102, or where multiple words or phrases are presented as part of the same query, as in a request for "sales of golf equipment in Toronto on 2014". In these environments, the hierarchical query program 101 may repeat as to all search labels 102. At step 211, the hierarchical query program 101 accesses the hierarchical data source 103.

At step 212, the hierarchical query program 101 iterates over all nodes 103A. Formally, steps 212 describes the iteration as proceeding to the next node 103A until no nodes 103A remain. The hierarchical query program 101 may iterate by any means, with the various steps moved inside or outside of the displayed loop, as needed, according to ordinary computer programming techniques. Neither the start and end nodes 103A nor the order in which the nodes 103A are examined is of significance in one embodiment of the invention. However, it may be computationally advantageous to iterate over the nodes by traversing the hierarchical data source 103 through its parent-child relationships. In particular, this may be computationally advantageous when the hierarchical query program 101 calculates the contextual score 109 as described at step 214.

At step 213, the hierarchical query program determines the similarity score 108 for the node. As above, this may be done by any comparison algorithm. In one embodiment, text strings may be the content of the search label 102 and the node labels 107, and thus the hierarchical query program 101 takes the similarity score 108 as the edit distance or Levenshtein distance between the search label 102 and the node label 107, plus 1. It is may be useful, in one embodiment, to add one to the Levenshtein distance, strictly because of an artefact of the exemplary combination function for step 215—namely, multiplication with the contextual score 109. By adding 1 to the Levenshtein distance, the hierarchical query program 101 ensures that the similarity score 108 will have a minimum value of 1, and the information content of the contextual score 109 will not be eliminated as a result of multiplication by zero in the case of a perfect string match. This allows the hierarchical query program 101 to compare multiple perfect string matches on their positions in the hierarchical data source 103, relative to the context node 105.

Referring still to FIG. 2, at step 214, the hierarchical query program 101 compares the node 103A with the context node 105 to yield a contextual score 109. Abstractly, the contextual score may be generated by any means for encapsulating the distance, within the hierarchical data source 103, from the context node 105 to the node 103A, or the reverse. In one embodiment, the unmodified graph distance is used. The hierarchical query program reaches this value by counting the parent-child relationships within the hierarchical data source 103 that must be traversed in a path from the context node 105 to node 103A or vice versa. The graph distance may be modified in any number of ways; for example, traversing downward (i.e. more specific) from the context node 105 may be weighted more favorably (numerically lesser) than traversing up from the context node 105; the result of this is to tend to favor results that represent a more specific instance of the context node 105 over those that are more general.

At step 215, the hierarchical query program 101 combines contextual score 109 and the similarity score 108 for the node 103A to yield a combined score 110. In one embodiment, the scores 108 and 109 are combined by multiplying the contextual score 109 and the similarity score 108 together. More generally, the hierarchical query program 101 may employ any means of compositing the two values 108 and 109. For example, the scores 108 and 109 may be added, or their arithmetic mean may be taken. Wherever the scores 108 and 109 are to be multiplied, it may be advantageous for the values to be nonzero. For the similarity score 108, one embodiment of the hierarchical query program 101 takes the Levenshtein distance plus one, thus ensuring a minimum score of 1 in the case of a perfect match. For the contextual score 109, wherever graph distance is taken, a graph distance of zero will occur only for the context node 105. For this reason, the hierarchical query program 101 discards the context node 105, or any nodes 103A with contextual score 109, at step 216, below.

Referring still to FIG. 2, at step 216, the hierarchical query program 101 sanitizes the results. Specifically, the hierarchical query program discards some of the nodes 103A. Any discarded nodes may be removed or dropped from the result list 104, regardless of how the result list 104 is structured. More generally, step 216 may be understood as the hierarchical query program 101 discarding one or more of the nodes 103A according to one or more discard criteria. In general, the hierarchical query program 101 may apply, as discard criteria, any heuristic that tends to identify nodes 103A that are unlikely to be valuable results.

In one embodiment, the hierarchical query program 101 applies two heuristics as discard criteria. The first of these, applicable where the search label 102 and the node labels 107 are text strings, is that any nodes 103A for which the Levenshtein distance of the node label 107 to the search label 102 exceeds the length of the node label 107 should be discarded. In one embodiment, the hierarchical query program takes such results as complete misses, and thus discards them. In one embodiment, the hierarchical query program 101 treats the similarity score 108 as the Levenshtein distance plus 1 for the purpose of avoiding a similarity score 108 of zero. Thus, in the example of FIGS. 3-4, and in any embodiment where the similarity score 108 is taken for the Levenshtein distance plus one, the hierarchical query program compares the similarity score 108 to the length, plus one, of the node label 107. In general, and as claimed, the relevant heuristic is that, where the edit distance, however computed and disregarding any adjustments such as adding one, between the search label 102 and the node label 107 is greater than or equal to the length of the node label 107, the node 103A should be discarded as a viable result.

The second discard criterion is that the hierarchical query program should discard the context node 105, identified as the single node with a contextual score 109 of zero. This is applicable wherever the contextual score 109 is determined by graph distance or modified graph distance. This criterion represents an application of the heuristic that the hierarchical query program 101 should discard the same node 103A as previously accessed because the query source (i.e. a user) wants to change the current context. However, it should be noted that the user likely wants to change the current context only in one dimension, or in a limited number of dimensions of a multidimensional data structure of which the hierarchical data source 103 may represent the structure of only one dimension.

For this reason, the heuristic does not assume that the context of any particular dimension will be changed, but rather, the hierarchical query program returns, in the result list 104, the best matches for the current dimension (i.e. the current hierarchical data source 103), with the understanding that the true user intent may not be to change the context in the current dimension at all. In the example where the previous query requests "sales of golf equipment in Toronto in 2014" followed by "how about 2013?", the user plainly wants to change the context only in the time dimension from 2014 to 2013, however computing apparatus 100 may not be directly aware of this, and thus the hierarchical query program 101 operate on more than one of the available dimensions.

Referring still to FIG. 2, at step 217, the hierarchical query program 101 orders the result by the combined score 110. In one embodiment, the combined scores 110 are normalized so that lesser values represent a better match. Where the result list 104 comprises a linear data structure, step 217 may be understood as sorting the list, array, or other linear structure by the combined score 110. Where the hierarchical query program 101 retains only a single best node, it may generate the result list 104 as a single reference, to be replaced as needed. In other embodiments, the result list 104 comprises a linear list of all remaining (not sanitized) nodes 103A, or the best n nodes for a given n, where n is greater than or equal to one.

At step 218, the hierarchical query program 101 returns a result. The result may generally be of any form and generally based on the ordering of the nodes 103A by combined score 110. To return the result, the hierarchical query program 101 may transmit the result list 104 to another layer, processor or program, may store the result list 104 in one or more computer readable storage media, may alter the hierarchical data source 103 in situ, or generally communicate the result.

Referring now to FIGS. 3-4, FIG. 3 shows an exemplary hierarchical data source 103 as one embodiment of the hierarchical query program 101 may access it. FIG. 3 displays the search label 102, the hierarchical data source 103, the nodes 103A, the node labels 107, and the context node 105. FIG. 4 shows the result list 104 that may follow from the example data of FIG. 3. FIG. 4 displays the result list 104, the node labels 107, the similarity scores 108, the contextual scores 109, and the combined scores 110. In the example of FIG. 3, the hierarchical query program 101 receives the search label 102, "Ottawa", and the given context node 105 has node label 107 "Toronto". As shown, the data of the example of FIGS. 3-4 are arranged such that each node 103A is a specific instance of its parent, with community names being children of regional names, which in turn are children of national names, which in turn are children of the root node "places". The greater context for the example shown is an exchange wherein a user has previously queried "sales of golf equipment in Toronto in 2014" and has now continued with "how about Ottawa?"

FIG. 4 summarizes the results of the hierarchical query program 101 to the data of FIG. 3, as the results might appear in a result list 104. Within the example results, the context node 105 with node label 107 "Toronto" is discarded according to step 216 because it is the context node with contextual score 109 equal to zero. Further, the nodes with node labels 107 "Ohio" and "Places" are discarded because their similarity scores 108 are equal to or greater than one plus the length of their respective node labels 107.

The clear best result, in the example shown, is Ottawa, Ontario, which has a combined score of 2. Ottawa, Ontario is both a perfect string match for the search label "Ottawa", but also a strong contextual match because it is a peer in the hierarchical data source 103—Ottawa and Toronto are both child nodes of Ontario. By contrast, an equally perfect string match for Ottawa, Ohio receives a combined score 110 of 6 due to being relatively disparate from the context node 105, Toronto, and thus has a less favorable contextual score 109. Similarly named nodes that are hierarchically near Toronto, such as Mattawa, Ontario, and Ontario itself, both receive favorable combined scores. More generally, the table of FIG. 4 shows numerical combined scores 110 that are intuitively sensible, given the input queries, and which perform better than could be done when considering either Levenshtein distance or graph distance alone.

The functionality disclosed herein may be built into an ASR natural language search interface for portable electronic communication devices, for example Apple® Siri®, Google® Now™, and Microsoft® Cortana™, which may optionally store the hierarchical data source 103 locally or access it over a network. Separately, the functionality disclosed herein may be built into a user query interface to a multidimensional hierarchical data set such as an OLAP cube. The functionality disclosed herein may be incorporated into a combined system that uses an ASR interactive natural language search interface to a multidimensional hierarchical data set such as an OLAP cube.

Figure 5:
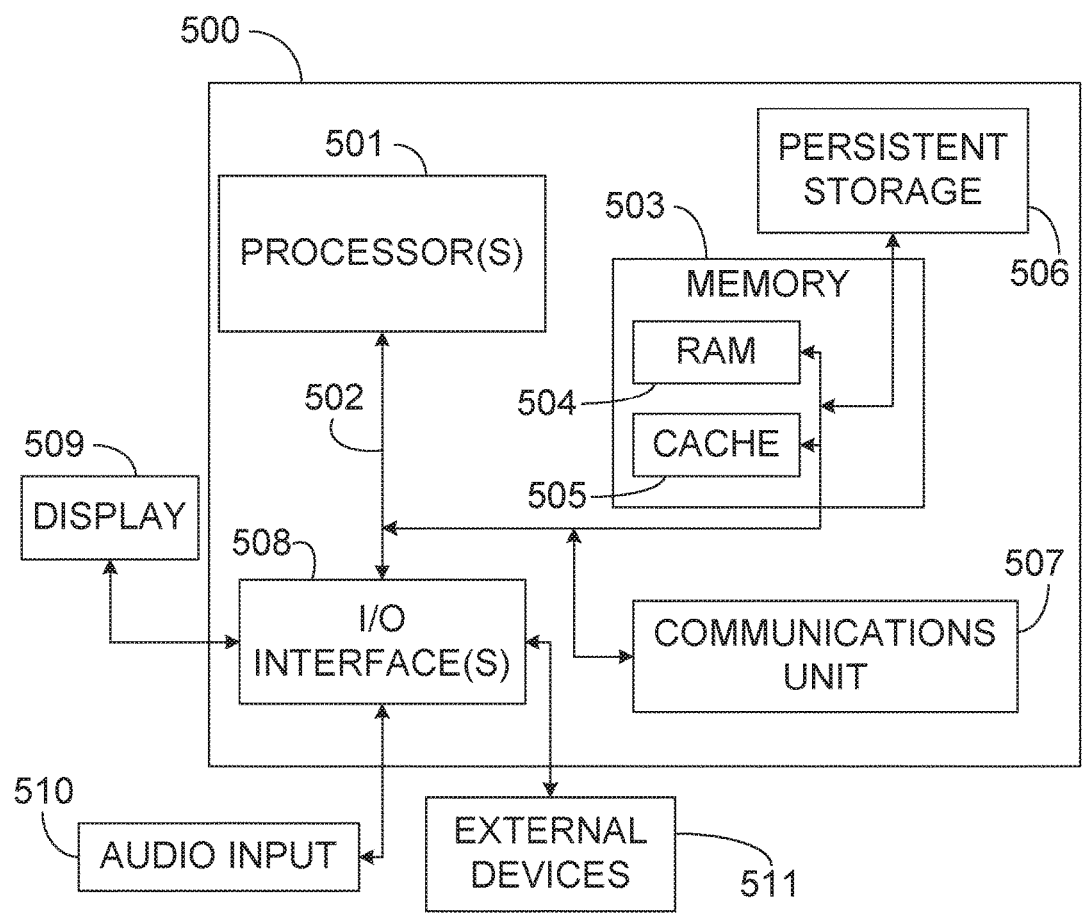
FIG. 5 is a block diagram of one example of a computing apparatus 100 suitable for executing the hierarchical query program 101.

FIG. 5 is a block diagram depicting components of a computer 500 suitable for executing the hierarchical query program 101. FIG. 5 displays the computer 500, the one or more processor(s) 501 (including computer processors), the communications fabric 502, the memory 503, the RAM 504, the cache 505, the persistent storage 506, the communications unit 507, the I/O interfaces 508, the display 509, the audio input 510, and the external devices 511. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the computer processor(s) 501, memory 503, persistent storage 506, communications unit 507, and input/output (I/O) interface(s) 508. The communications fabric 502 may be implemented with any architecture suitable for passing data or control information between the processors 501 (e.g. microprocessors, communications processors, and network processors), the memory 503, the external devices 511, and any other hardware components within a system. For example, the communications fabric 502 may be implemented with one or more buses.

The memory 503 and persistent storage 506 are computer readable storage media. In the depicted embodiment, the memory 503 comprises a random access memory (RAM) 504 and a cache 505. In general, the memory 503 may comprise any suitable volatile or non-volatile one or more computer readable storage media.

Program instructions for the hierarchical query program 101 may be stored in the persistent storage 506, or more generally, any computer readable storage media, for execution by one or more of the respective computer processors 501 via one or more memories of the memory 503. The persistent storage 506 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 506 may also be removable. For example, a removable hard drive may be used for persistent storage 506. Other examples include optical and magnetic disks, thumb drives, and smart cards that are inserted into a drive for transfer onto another computer readable storage medium that is also part of the persistent storage 506.

The communications unit 507, in these examples, provides for communications with other data processing systems or devices. In these examples, the communications unit 507 may comprise one or more network interface cards. The communications unit 507 may provide communications through the use of either or both physical and wireless communications links. In the context of some embodiments of the present invention, the source of the search label 102 may be physically remote to the computer 500 such that the search label 102 may be received and the result list 104 similarly transmitted via the communications unit 507.

The I/O interface(s) 508 allow for input and output of data with other devices that may operate in conjunction with the computer 500. For example, the I/O interface 508 may provide a connection to the external devices 511, which may be as a keyboard, keypad, a touch screen, or other suitable input devices. External devices 511 may also include portable computer readable storage media, for example thumb drives, portable optical or magnetic disks, and memory cards. Software and data used to practice embodiments of the present invention may be stored on such portable computer readable storage media and may be loaded onto the persistent storage 506 via the I/O interface(s) 508. The I/O interface(s) 508 may similarly connect to a display 509. The display 509 provides a mechanism to display data to a user and may be, for example, a computer monitor. The I/O interface(s) 508 may similarly connect to an audio input 510. The audio input 510 provides a mechanism to receive speech data from a user, as may be taken in some embodiments of the present invention, and may be, for example, a microphone.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for scoring the results of querying structured hierarchical data, the computer-implemented method comprising:
    receiving a search label;
    accessing a structured hierarchical data source comprising a plurality of nodes, one of said plurality of nodes being a context node, wherein the structured hierarchical data source is constrained such that child nodes represents a specific instance of their parent;
    determining a similarity score between said search label and a node label of each of said plurality of nodes;
    determining a contextual score between said context node and each of said plurality of nodes;
    combining, for each of said plurality of nodes, said similarity score with said contextual score to yield a combined score based on multiplying the similarity score by the contextual score; and
    returning a result based on ordering said plurality of nodes according to said combined score of each of said plurality of nodes and returning the node with the lowest combined score.

2. The computer-implemented method of claim 1, wherein said search label and said node label are text strings, and wherein determining a similarity score between said search label and a node label of each of said plurality of nodes comprises calculating an edit distance between said search label and said node label of each of said plurality of nodes.

3. The computer-implemented method of claim 2, wherein determining a contextual score between said context node and each of said plurality of nodes comprises calculating a graph distance between each of said plurality of nodes and said context node.

4. The computer-implemented method of claim 3, further comprising discarding one or more of said plurality of nodes according to one or more discard criteria.

5. The computer-implemented method of claim 4, wherein one of said one or more discard criteria comprises discarding any of said plurality of nodes for which said edit distance is greater than or equal to the length of said node label.

6. The computer-implemented method of claim 4, wherein one of said one or more discard criteria comprises discarding any of said plurality of nodes for which said graph distance is zero.

7. The computer-implemented method of claim 2, wherein said node label and said search label comprise phonetically spelled natural language.

8. The computer-implemented method of claim 1, wherein determining a contextual score between said context node and each of said plurality of nodes comprises calculating a graph distance between each of said plurality of nodes and said context node.

9. The computer-implemented method of claim 1, wherein said hierarchical data source is structured such that each child node within said plurality of nodes represents a specific instance of its parent.

* * * * *